United States Patent
Leipheimer

(10) Patent No.: US 10,052,515 B2
(45) Date of Patent: Aug. 21, 2018

(54) ADJUSTABLE CAM FOR EXERCISE EQUIPMENT

(71) Applicant: Specialty Fitness Systems, LLC, Franklin, PA (US)

(72) Inventor: Jerry K. Leipheimer, Sharpsville, PA (US)

(73) Assignee: Specialty Fitness Systems, LLC, Franklin, PA (US)

(*) Notice: Subject to any disclaimer, the term of this patent is extended or adjusted under 35 U.S.C. 154(b) by 156 days.

(21) Appl. No.: 15/126,696

(22) PCT Filed: Mar. 27, 2015

(86) PCT No.: PCT/US2015/022997
§ 371 (c)(1),
(2) Date: Sep. 16, 2016

(87) PCT Pub. No.: WO2015/148925
PCT Pub. Date: Oct. 1, 2015

(65) Prior Publication Data
US 2017/0087403 A1    Mar. 30, 2017

Related U.S. Application Data

(60) Provisional application No. 61/971,570, filed on Mar. 28, 2014.

(51) Int. Cl.
*A63B 21/00* (2006.01)
*A63B 21/062* (2006.01)
(Continued)

(52) U.S. Cl.
CPC ...... *A63B 21/155* (2013.01); *A63B 21/00072* (2013.01); *A63B 21/0628* (2015.10);
(Continued)

(58) Field of Classification Search
CPC ............ A63B 21/155; A63B 23/03525; A63B 21/4033; A63B 23/0494; A63B 21/00072;
(Continued)

(56) References Cited

U.S. PATENT DOCUMENTS

| | | | |
|---|---|---|---|
| 4,982,956 A | 1/1991 | Lapcevic | |
| 5,102,121 A | 4/1992 | Solow et al. | |
| 5,356,360 A | 10/1994 | Johns | |
| 5,580,341 A * | 12/1996 | Simonson | A63B 23/1254 482/100 |
| 5,643,152 A * | 7/1997 | Simonson | A63B 23/1254 482/100 |
| 5,722,921 A | 3/1998 | Simonson | |
| 2003/0092540 A1 | 5/2003 | Gillen | |
| 2008/0058177 A1* | 3/2008 | Webber | A63B 21/0615 482/94 |
| 2008/0167169 A1* | 7/2008 | Giannelli | A63B 21/155 482/140 |

(Continued)

FOREIGN PATENT DOCUMENTS

EP    0857496 A2    8/1998

*Primary Examiner* — Andrew S Lo
(74) *Attorney, Agent, or Firm* — The Webb Law Firm

(57) ABSTRACT

A cam assembly is disclosed which includes a cam having a first cam pivot, a second cam pivot, and a machine shaft guide; a range plate which is engageable with the cam; a belt connected to the cam; and a machine shaft connected to the range plate. The first cam pivot defines the motion of a first arc and the second cam pivot guide defines the motion of a second arc as the cam is adjusted. A method of using a cam assembly is also disclosed which includes engaging an adjustor on a cam; releasing a connection between the cam and a range plate; rotating the cam; releasing the adjustor; and securing a connection between the cam and the range plate.

19 Claims, 4 Drawing Sheets

(51) Int. Cl.
*A63B 23/035* (2006.01)
*A63B 23/04* (2006.01)
*F16H 25/18* (2006.01)
*F16H 37/12* (2006.01)

(52) U.S. Cl.
CPC .... *A63B 21/4033* (2015.10); *A63B 23/03525* (2013.01); *A63B 23/0494* (2013.01); *F16H 25/18* (2013.01); *F16H 37/12* (2013.01); *A63B 21/4047* (2015.10); *A63B 2225/09* (2013.01)

(58) Field of Classification Search
CPC ............ A63B 21/0628; A63B 21/4047; A63B 2225/09; F16H 37/12; F16H 25/18; F16H 25/00–25/04
See application file for complete search history.

(56) References Cited

U.S. PATENT DOCUMENTS

| | | | |
|---|---|---|---|
| 2008/0312039 A1* | 12/2008 | Bucay-Bissu | A63B 21/00076 482/5 |
| 2010/0120590 A1* | 5/2010 | Inaizumi | A63B 23/0405 482/99 |
| 2010/0152001 A1* | 6/2010 | Gordon | A63B 21/155 482/53 |
| 2010/0204021 A1* | 8/2010 | Giannelli | A63B 21/155 482/94 |
| 2011/0034304 A1 | 2/2011 | Kuo | |
| 2016/0346585 A1* | 12/2016 | Habing | A63B 21/22 |

* cited by examiner

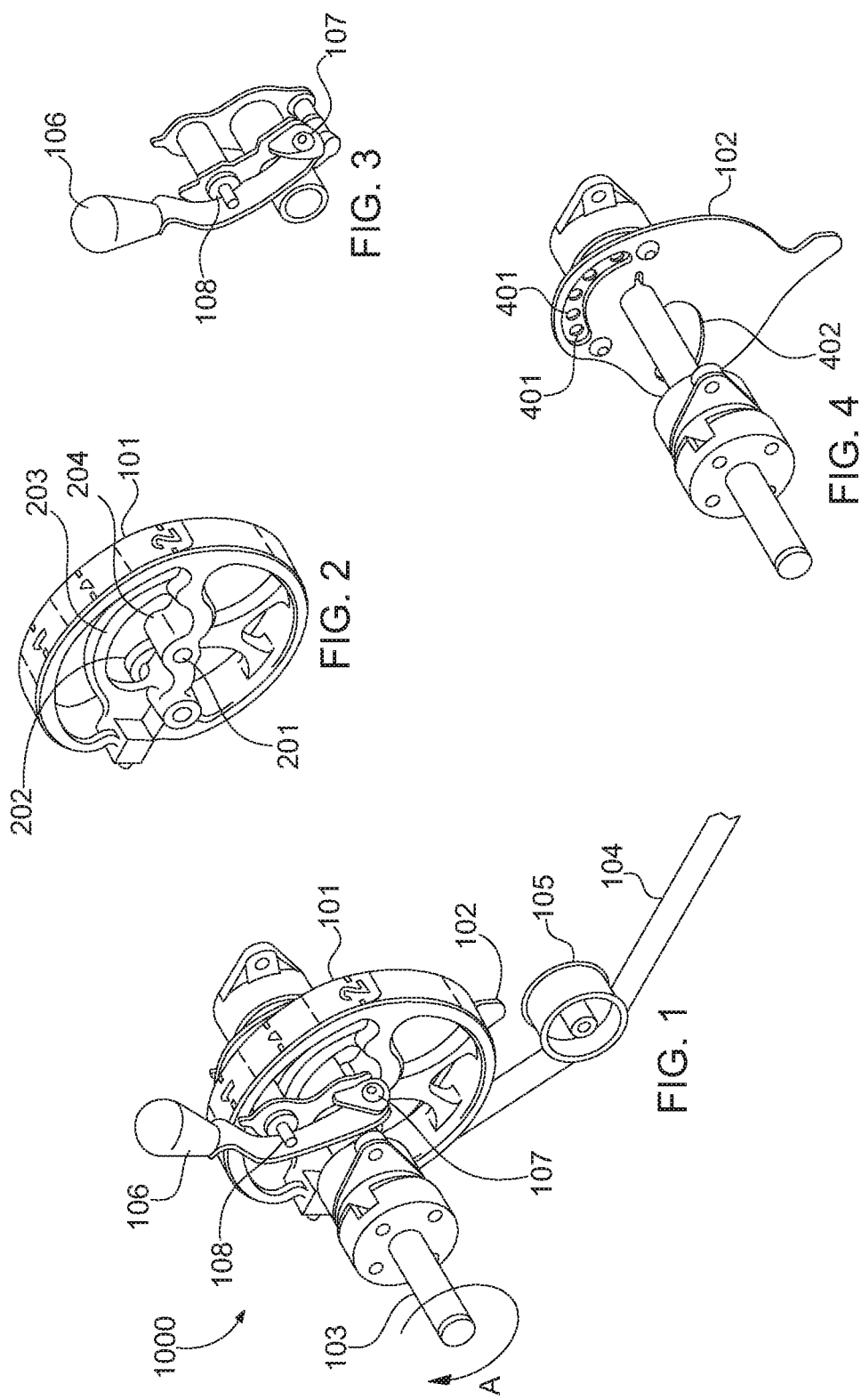

ADJUSTABLE CAM FOR EXERCISE EQUIPMENT

CROSS-REFERENCE TO RELATED APPLICATIONS

This application is the United States national phase of International Application No. PCT/US2015/022997 filed Mar. 27, 2015, and claims priority to U.S. Provisional Patent Application No. 61/971,570 filed Mar. 28, 2014, the disclosures of which are hereby incorporated in their entirety by reference.

BACKGROUND OF THE INVENTION

Field of the Invention

The present invention relates generally to cams. Particularly, the invention relates to adjustable cams designed for exercise equipment Description of Related Art In this country there is a concern about the growing obesity rate and counteracting an increasingly sedentary lifestyle. More people are going to the gym and finding exercise machines a safer alternative to free weights. Exercise machines are becoming more sophisticated, and gyms are buying more machines to focus on different muscle groups. However, there has not been a lot of work in fine-tuning individual exercise machines to allow a user to alter the strength curve (i.e., how much weight is applied at each point in the movement).

U.S. Pat. No. 4,982,956 to Lapcevic discloses adjusting the strength curve by rotating the cam about the machine shaft. Lapcevic also discloses that a supplemental cable receiving mechanism is needed to keep the cable taut.

U.S. Patent Publication No. 2003/0092540 to Gillen discloses a range limiting device that uses multiple cam followers and a defined track on the exercise frame to adjust the cam. Gillen also discloses tracking the belt to keep the belt tight.

U.S. Pat. No. 5,722,921 to Simonson discloses a range limiting device like Gillen, where the exercise input arm is attached to the cam and works with the cam to change the strength curve. Like Lapcevic, Simonson needs a supplemental cable or belt receiving mechanism to keep the belt tight.

U.S. Pat. No. 5,356,360 to Johns is similar to Simonson but does not use a track mechanism attached to the frame to resist backward movement of the cam and to control cable slack. Rather, Johns uses a linkage to control cable slack. Further, like the other prior art, Johns discloses rotating the cam around the input shaft to achieve the strength curve.

U.S. Pat. No. 5,102,121 to Salow discloses using a supplemental cable receiving device where the cam profile rotates around the main axis for strength curve.

The exercise cams of the prior art use supplemental cables or belts, rather than attaching the belt to the cam directly. Further, the prior art discloses adjusting the strength curve by rotating the cam around the machine shaft in a single arc, which limits the adjustability of the cam in the exercise machine.

The need exists for an exercise machine where the belt from the weight stack attaches directly to the cam, and where the cam rotates about multiple arcs.

SUMMARY OF THE INVENTION

The present invention relates to a cam assembly which comprises a cam having a first cam pivot, a second cam pivot, and a machine shaft guide; a range plate which is engageable with the cam; a belt having a first end and a second end connected at the first end to the cam; and a machine shaft connected to the range plate, wherein the first cam pivot and the second cam pivot guide the cam as it is adjusted.

In an alternate embodiment, the cam further comprises an adjustor which allows for the engagement between the range plate and the cam. The adjustor is preferably a lever. Further, the range plate contains at least one aperture and the adjustor contains an adjustor pin, which traverses the cam and engages with the at least one aperture.

The machine shaft can traverse the cam between the machine shaft guide and a machine shaft track. In this embodiment, adjusting the cam allows for a movement of the cam about the machine shaft in a non-circular motion.

Preferably, the cam, the range plate, or both, are made of metal.

The second cam pivot is defined by a pivot track follower in engagement with a pivot track.

In another, non-limiting embodiment, the first cam pivot is defined by a first linkage between the cam and the range plate. The second cam pivot can also be defined by a second linkage between the cam and the range plate.

As the cam is moved during adjustment, the belt connected with the cam remains taut.

Another embodiment of the cam assembly is a cam assembly comprising a cam having a first pivot and a second pivot, a range plate, the range plate having a pivot track in the range plate that guides the second pivot of the cam, a machine shaft engaged with the range plate, a belt with a first end and a second end, the belt being connected to the cam at the first end and a weight unit at the second end, and an adjustor with a first end and a second end, wherein the adjustor is connected at the adjustor first end to the range plate by an adjustor pivot mount and the first cam pivot at the adjustor second end. Further, when the adjustor is engaged, the first cam pivot and second cam pivot guide the cam in such a way that the belt will stay taut between the cam and the weight unit.

The second end of the belt is engaged with a weight unit.

An alternate embodiment is a method of using a cam assembly comprising the steps of engaging an adjustor on a cam; releasing a connection between the cam and a range plate; rotating the cam; releasing the adjustor; and securing a connection between the cam and the range plate.

Engaging the adjustor on the cam further comprises engaging a lever to release the connection between the cam and the range plate.

Rotating the cam further comprises rotating the cam about a machine shaft in engagement with a machine shaft guide.

When the cam rotates about the machine shaft, the cam is guided by a first arc and a second arc.

BRIEF DESCRIPTION OF THE DRAWING(S)

FIG. 1 is a perspective view of a cam assembly;

FIG. 2 is a perspective view of a cam;

FIG. 3 is a perspective view of an adjustor;

FIG. 4 is a perspective view of the cam assembly without the cam;

DESCRIPTION OF THE INVENTION

Figure 5:
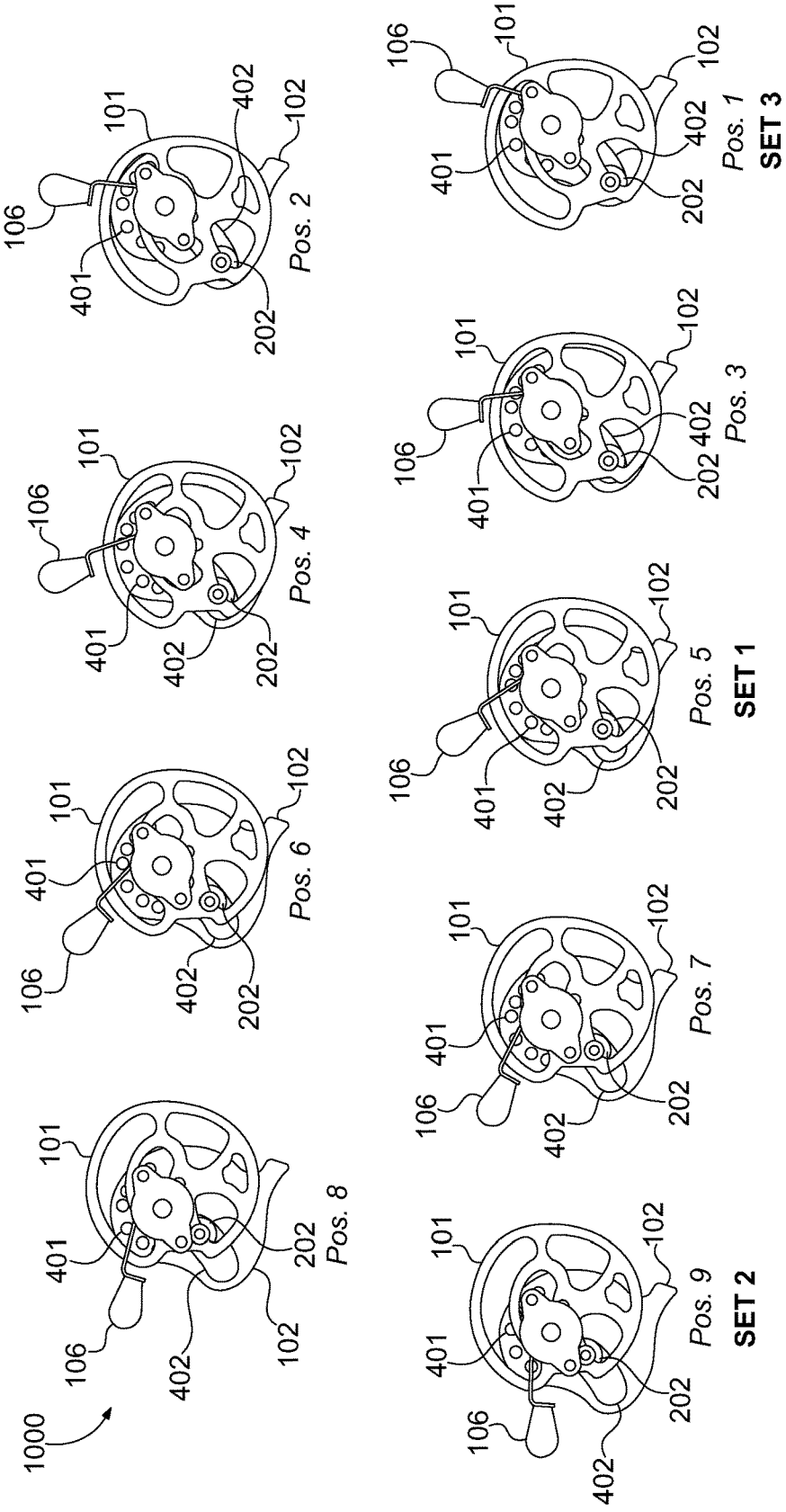
FIG. 5 is a view of the different cam assembly positions.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

According to a preferred and non-limiting embodiment, an adjustable cam is used to vary the weight load based on adjustments made by the user. The user is able to adjust the resistance and strength curve of the exercise machine by adjusting a lever or dowel pin to alter the first and second axes of rotation of a cam with respect to the machine axis of rotation.

Referring now to FIG. 1, a cam assembly 1000 includes a cam 101 and a range plate 102. The cam 101 and range plate 102 rotate about a machine shaft 103 when the machine shaft 103 is actuated in a circular motion, such as in direction A. A belt 104 connects the cam assembly 1000 with the weight unit (not shown) via at least one belt pulley 105. As the machine shaft 103 rotates in a direction A, the cam 101 rotates concurrently and pulls on the belt 104 to lift the weight unit.

In order to alter the strength curve, the user is able to move the cam by first releasing an adjuster 106. In a preferred and non-limiting embodiment, the cam 101 contains an adjustor 106, which acts as a detent to secure the cam 101 in position. The adjustor 106 is preferably a lever which rotates about the adjustor pivot mount 107. The adjustor 106 therefore rotates about the adjustor pivot mount 107. The adjustor 106 has a spring to maintain its position. When the user applies a force on the adjustor 106 opposite the direction of the spring force, the adjustor 106 rotates about the adjustor pivot mount 107 and pulls on an adjustor pin 108. The user can then move the cam 101 to the desired position and release the adjustor 106 to secure the cam 101 in position. When the user releases the adjustor 106, the adjustor pin 108 is secured into a groove or hole in the range plate 102, or presses against the range plate 102 such that the cam 101 is secured in position. While the adjustor 106 is preferably a lever, the adjustor 106 can be anything which secures the position of the cam 101 against the range plate 102, such as a bolt which threads into drilled holes of the range plate 102, or a bolt which forces a plate or a pad against the range plate 102.

Referring now to FIG. 2, a first cam pivot 201 and a pivot track follower 202 are shown. The first cam pivot 201 is located at the base of the adjustor pivot mount 107 of FIG. 1. Referring still to FIG. 2, the pivot track follower 202 guides the cam 101 along the range plate 102 (not shown in FIG. 2). As the cam 101 is adjusted, the first cam pivot 201 follows a first arc and the pivot track follower 202 follows a second arc. The machine shaft 103 (not shown in FIG. 2) traverses the cam 101 and contacts the machine shaft guide 204. A machine shaft track 203 can be used to create an aperture between the machine shaft guide 204 and machine shaft track 203. Any such aperture is preferably larger in size than the circumference of the machine shaft 103 such that when the cam 101 is adjusted, the cam 101 does not rotate about the machine shaft 103 in a perfectly circular motion, as it would if the aperture were, for example, a bearing having an inner circumference equal to the machine shaft 103 outer circumference. In this way, when the cam 101 is adjusted, the cam 101 is guided by the first and the second arc, which are defined by the position and shape of the first cam pivot 201 and the pivot track follower 202, respectively, rather than about the machine shaft 103.

In a preferred but non-limiting embodiment, the first arc, second arc, machine shaft guide 204, and the shape of cam 101 are designed such that as the cam 101 is adjusted, the belt 104 (as seen in FIG. 1) remains taut. In this embodiment, as the cam 101 rotates or moves during adjustment, the shape of the cam 101 and its path of movement keeps the belt taut without any additional cables, levers, etc.

FIG. 3 shows a more detailed view of the adjustor 106, including the adjustor pivot mount 107 and adjustor pin 108. As described above, engagement of the adjustor 106 rotates the adjustor 106 about the adjustor pivot mount 107 and pulls on the adjustor pin 108. The adjustor pin 108 of FIGS. 1 and 3 fits into one of the adjustment holes 401 of the range plate 102 shown in FIG. 4.

Referring now to FIG. 4, the range plate 102 is shown with adjustment holes 401 and the pivot track 402 which guides the pivot track follower 202 of FIG. 2. The pivot track 402 and pivot track follower 202 form a second cam pivot and the second arc, which guides the cam 101 along the range plate 102 such that the cam 101 does not necessarily rotate in a perfectly circular motion around the machine shaft 103. The pivot track 402 also limits the movement of the cam 101 such that it does not rotate to a position where there is no adjustment hole 401 for the adjustment pin 108 to be secured.

Referring back to FIG. 1, the cam 101 and the range plate 102 can move independently, and in unison. When the position of the cam 101 is being adjusted with relation to the range plate 102, it is necessary that the cam 101 can rotate independently. When the cam 101 is set in position by the user setting the adjustor 106, the cam 101 and the range plate 102 engage with one another and move concurrently. When the machine shaft 103 rotates, such as in direction A, the machine shaft 103 rotates the range plate 102. Because the cam 101 is secured to the range plate 102, it rotates about the machine shaft 103 as well.

The cam 101 can be made of any material strong enough to withstand the maximum weight of the corresponding weight unit. Preferably, the cam 101 and the range plate 102 are made of metal, and coated with paint or an anti-corrosive finish if humidity and rust are a concern. While metal is preferred, any other material, such as a polymer or a plastic, could be used. The adjustor pin 108 should also be made of a material that is strong enough to maintain its integrity when the maximum weight of the weight unit is applied. If the adjustor pin 108 material is not strong enough, it could shear under duress and disengage the cam 101 with the range plate 102. Again, metal is preferred, but alternate materials, such as plastics or polymers, could be used.

The belt 104 can also be any material which is able to support the maximum weight of the weight unit. Further, the belt 104 is preferably flexible enough to move fluidly around a pulley. For example, the belt 104 can be a rubber belt, a metal cable, or a knuckle chain.

FIG. 5 illustrates an example of the different configurations of the cam assembly 1000. In the embodiment of FIG. 5, the cam assembly 1000 is shown with a range plate 102 having nine adjustment holes 401. The nine positions show the nine configurations when the adjustor 106 is engaged with each of the adjustment holes 401. In comparing Pos. 1 with Pos. 9, where the adjustor 106 is positioned in the outermost adjustment holes 401, it can be appreciated how the pivot track follower 202 and the pivot track 402 guide the motion of the cam 101 during adjustment, such that the cam does not necessarily rotate as a perfect circle. As the cam 101 rotates between Pos. 1 and Pos. 9, different parts of the range plate 102 are exposed, indicating that the cam 101 is not rotating about a center of a circle.

Figure 6:
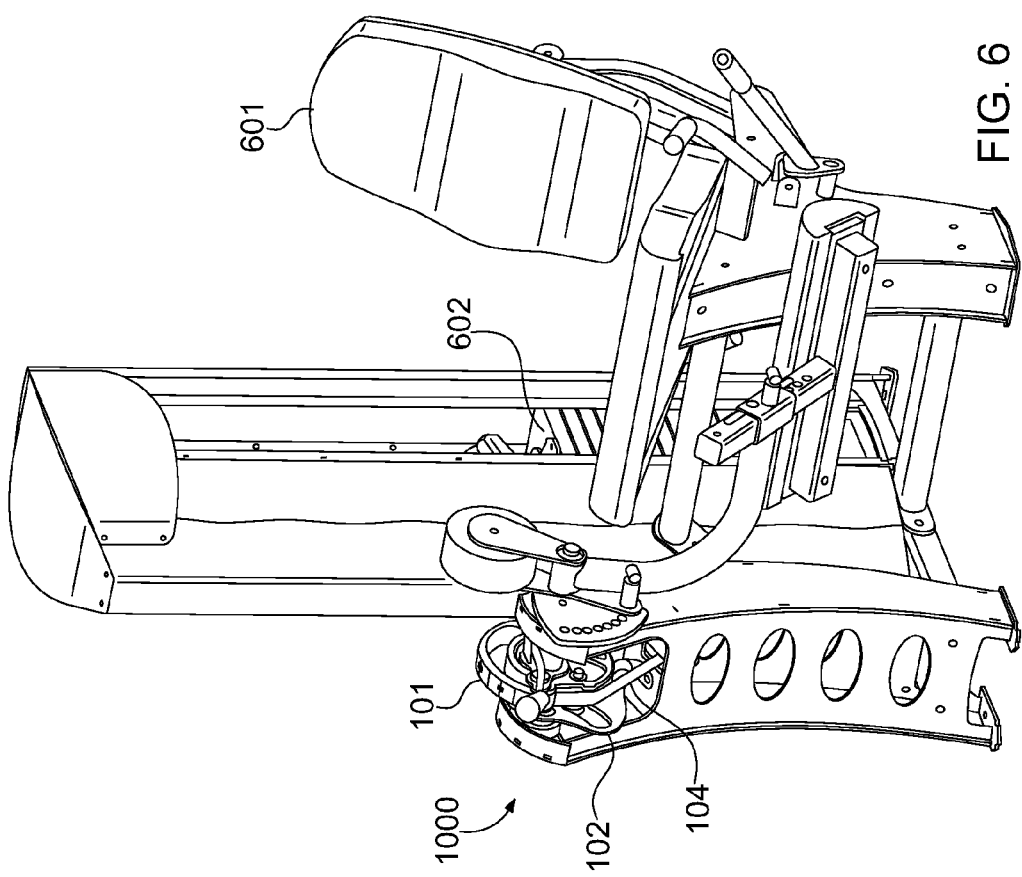
FIG. 6 is a perspective view of the cam assembly in an exercise machine.

FIG. 6 shows the cam assembly 1000 when used in an exercise machine 601. As can be seen, it is preferable that the cam assembly 1000 is in line with the weight unit 602 so that the belt 104 can engage the weight unit 602 and distribute the weight among pulleys, rather than making any turns. While the exercise machine 601 is depicted as a leg exercise machine, the cam assembly 1000 can be used in any exercise machine 601 where a weight unit 602 is engaged. Further, while FIG. 6 shows the weight unit 602 as a stack of weights, the weight unit 602 can be a shaft for holding free weights, a weighted lever, or any other mechanism which provides resistance in at least one direction of the machine's movement.

Figure 7:
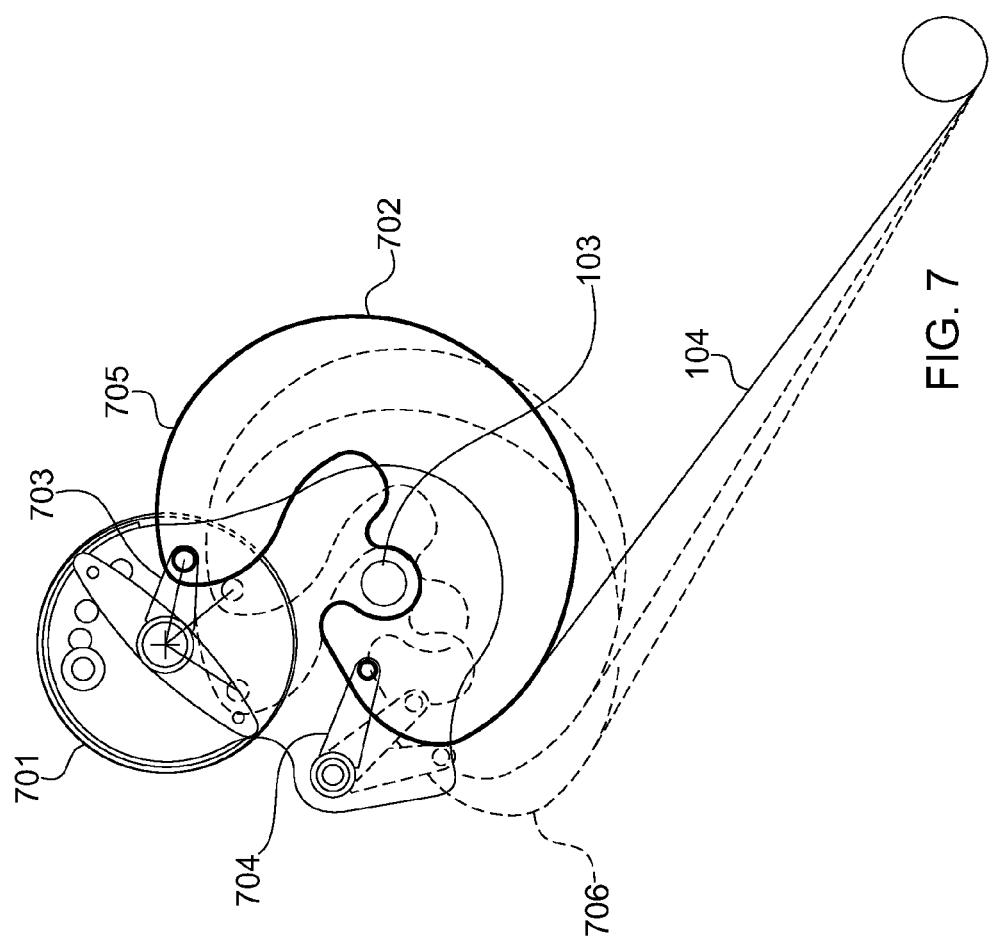
FIG. 7 is an alternate embodiment of the cam.

FIG. 7 depicts an alternate embodiment of the cam assembly 1000. In FIG. 7, there is no pivot track, but the alternate range plate 702 engages the alternate cam 701 using a first linkage 703 and a second linkage 704. The first linkage 703 and the second linkage 704 each define a first and second pivot, as in the embodiment with a pivot track. The range of motion of the first linkage 703 and the second linkage 704 defines a first arc and a second arc, respectively. As the alternate cam 701 is moved from a first position 705 to a second position 706, the first linkage 703 and second linkage 704 move concurrently and secure the alternate cam 701 in position with respect to the alternate range plate 702.

EXAMPLES

The following tables provide illustrative examples of how the cam assembly 1000 functions. The numbers in the following examples were obtained using the embodiment of FIG. 5. The labelling of the different examples is the same as the labelling convention of FIG. 5. The following examples are exemplary, and do not impose any limitations on the dimensions or configuration of the cam assembly 1000.

Example 1

The following example shows the data of "Set 1," which is Pos. 5 in FIG. 5. This is representative data of when the adjustor 106 is secured with the middle adjustment hole 401.

| Angle in Exercise Rotation (degrees) | Distance from the Pivot (inches) | Percent of Weight of Weight Unit (%) |
| --- | --- | --- |
| Start | 4.7908 | 87.99 |
| 17.5 | 5.1595 | 94.76 |
| 35 | 5.390804 | 99.00 |
| 52.5 | 5.476 | 100.57 |
| 70 | 5.4293 | 99.71 |
| 87.5 | 5.269 | 96.77 |
| 105 | 5.02009 | 92.20 |
| 122.5 | 4.7064 | 86.44 |

Example 2

The following example shows the data of "Set 2," which is Pos. 9 in FIG. 5. This is representative data of when the adjustor 106 is secured with one of the furthest adjustment holes 401.

| Angle in Exercise Rotation (degrees) | Distance from the Pivot (inches) | Percent of Weight of Weight Unit (%) |
| --- | --- | --- |
| Start | 3.233 | 59.38 |
| 17.5 | 3.6911 | 67.79 |
| 35 | 4.2048 | 77.22 |
| 52.5 | 4.6986 | 86.29 |
| 70 | 5.1026 | 93.71 |
| 87.5 | 5.3719 | 98.66 |
| 105 | 5.4926 | 100.87 |
| 122.5 | 5.4736 | 100.53 |

Example 3

The following example shows the data of "Set 3," which is Pos. 1 in FIG. 5. This is representative data of when the adjustor 106 is secured with the furthest adjustment hole 401 opposite the adjustment hole 401 of Pos. 9.

| Angle in Exercise Rotation (degrees) | Distance from the Pivot (inches) | Percent of Weight of Weight Unit (%) |
| --- | --- | --- |
| Start | 5.4451 | 100.00 |
| 17.5 | 5.4246 | 99.63 |
| 35 | 5.2885 | 97.13 |
| 52.5 | 5.059 | 92.91 |
| 70 | 4.7626 | 87.47 |
| 87.5 | 4.4196 | 81.17 |
| 105 | 4.0539 | 74.45 |
| 122.5 | 3.6881 | 67.73 |

With reference to FIG. 5, the above examples illustrate that, depending on the position of the cam 101 with the range plate 102, the percent of the weight unit experienced by the user changes. In Example 1, the exercise begins and ends with a lower weight unit percentage than in the middle of the exercise. In Example 2, the exercise begins with a lower percentage and ends with a high percentage. In Example 3, the weight percentage is high at the start of the motion and lower at the end of the motion.

The adjustability of the strength profile allows users to more easily tailor their exercise to their fitness goals. For a user looking to gain more strength at the end of the motion, they could adjust the cam to that of Example 2. For example, a user who wants to work on their strength at the beginning of a motion could adjust the cam to that of Example 3.

The invention claimed is:

1. A cam assembly comprising:
   a cam having a first cam pivot, a second cam pivot, and a machine shaft guide;
   a range plate which is engageable with the cam;
   a belt having a first end and a second end, wherein the belt is connected at the first end to the cam; and
   a machine shaft connected to the range plate,
   wherein the first cam pivot and the second cam pivot guide the cam as the cam is adjusted.

2. The cam assembly of claim 1, wherein the cam further comprises an adjustor which allows for the engagement between the range plate and the cam.

3. The cam assembly of claim 2, wherein the adjustor is a lever.

4. The cam assembly of claim 1, wherein the range plate contains at least one aperture and the adjustor contains an adjustor pin, which traverses the cam and engages with the at least one aperture.

5. The cam assembly of claim 1, wherein the machine shaft traverses the cam between the machine shaft guide and a machine shaft track.

6. The cam assembly of claim 5, wherein adjusting the cam allows for a movement of the cam about the machine shaft in a non-circular motion.

7. The cam assembly of claim 1, wherein the cam is made of metal.

8. The cam assembly of claim 1, wherein the range plate is made of metal.

9. The cam assembly of claim 1, wherein the second cam pivot is defined by a pivot track follower in engagement with a pivot track.

10. The cam assembly of claim 1, wherein the first cam pivot is defined by a first linkage between the cam and the range plate.

11. The cam assembly of claim 1, wherein the second cam pivot is defined by a second linkage between the cam and the range plate.

12. The cam assembly of claim 1, wherein the belt remains taut as the cam is adjusted into a position.

13. The cam assembly of claim 1, wherein the second end of the belt is engaged with a weight unit.

14. A cam assembly comprising:
   a cam having a first cam pivot and a second cam pivot;
   a range plate, the range plate having a pivot track in the range plate that guides the second cam pivot;
   a machine shaft engaged with the range plate;
   a belt with a first end and a second end, the belt being connected to the cam at the first end and a weight unit at the second end; and
   an adjustor with a first end and a second end, wherein the adjustor is connected at the adjustor first end to the range plate by an adjustor pivot mount and the first cam pivot at the adjustor second end;
   wherein as the adjustor is engaged, the first cam pivot and second cam pivot guide the cam in such a way that the belt will stay taut between the cam and the weight unit.

15. The cam assembly of claim 14, wherein the adjustor has an adjustor pin that engages with the range plate.

16. A method of using a cam assembly comprising the steps of:
   engaging an adjustor on a cam;
   releasing a connection between the cam and a range plate;
   rotating the cam;
   releasing the adjustor; and
   securing a connection between the cam and the range plate.

17. The method of using the cam assembly according to claim 16, wherein engaging the adjustor on the cam further comprises engaging a lever to release the connection between the cam and the range plate.

18. The method of using the cam assembly according to claim 16, wherein rotating the cam further comprises rotating the cam about a machine shaft in engagement with a machine shaft guide.

19. The method of using the cam assembly according to claim 18, wherein the cam rotating about the machine shaft is guided by a first arc and a second arc.

* * * * *